Sept. 8, 1936.   A. URFER   2,053,409
MEANS FOR REPEATING ANGULAR MOVEMENTS
Filed Aug. 15, 1930   2 Sheets-Sheet 1

INVENTOR
*Adolf Urfer.*
BY
*F. R. Smith.*
ATTORNEY

Sept. 8, 1936.   A. URFER   2,053,409
MEANS FOR REPEATING ANGULAR MOVEMENTS
Filed Aug. 15, 1930   2 Sheets-Sheet 2

INVENTOR
Adolf Urfer.
BY F. B. Smith.
ATTORNEY

Patented Sept. 8, 1936

2,053,409

UNITED STATES PATENT OFFICE 2,053,409

MEANS FOR REPEATING ANGULAR MOVEMENTS

Adolf Urfer, Richmond Hill, N. Y., assignor to Pioneer Instrument Company, Incorporated, Brooklyn, N. Y., a corporation of New York Application August 15, 1930, Serial No. 475,544

5 Claims. (Cl. 177—351)

The present invention relates to navigational devices, and more particularly to means adapted to indicate the deviation of a mobile object, such as a ship, from a selected or predetermined path or course, and to means for repeating relative angular movements between a mobile object and a directional device, such as a compass, carried by said object.

One of the objects of the invention is to provide in combination with a directional or controlling device, such as a magnetic compass, novel means for indicating differences in the relative angular position between the directional device and a mobile object, such as a ship or an aircraft, on which said device is mounted.

Another object is to provide novel means for repeating relative angular movements between a mobile object and a directional device carried by said object, whereby the use of a circuit embodying an electrolyte and a direct current is rendered unnecessary, and which includes as a step the variation of electrical coupling between a pair of circuits by relative movement between the mobile object and the directional device.

Another object is to provide in combination with a magnetic compass, novel means including an indicator located at a distance from said compass for indicating relative angular movement between the compass card and the mobile object on which said compass is mounted.

A further object is to provide in combination with a magnetic compass and a follow-up system therefor, a novel repeating device the operation of which shall be performed electrically rather than mechanically and which depends on the principle of electro-magnetic induction.

Still another object is to provide novel means for association with a magnetic compass, which is so designed as to depend for operation upon changes in the reactance of an electrical circuit or circuits energized by an alternating current whereby the directional force of the magnetic compass is unaffected and the use of a circuit embodying an electrolyte is rendered unnecessary.

A still further object is to provide novel means for association with a magnetic compass, which is so designed as to depend for operation upon the variation of electrical coupling between a pair of circuits by relative movement between the mobile object and the magnetic elements of the compass.

Other objects and advantages of the invention will appear more fully hereinafter from the following description taken together with the accompanying drawings, which illustrate two embodiments of the invention. It is to be expressly understood, however, that the drawings are for purposes of illustration and description only, and are not designed as a definition of the limits of the invention, reference being had for this purpose to the appended claims.

In the drawings, wherein like reference characters refer to like parts throughout the several views, Fig. 1 is a schematic diagram of one embodiment of the invention;

Figure 1:
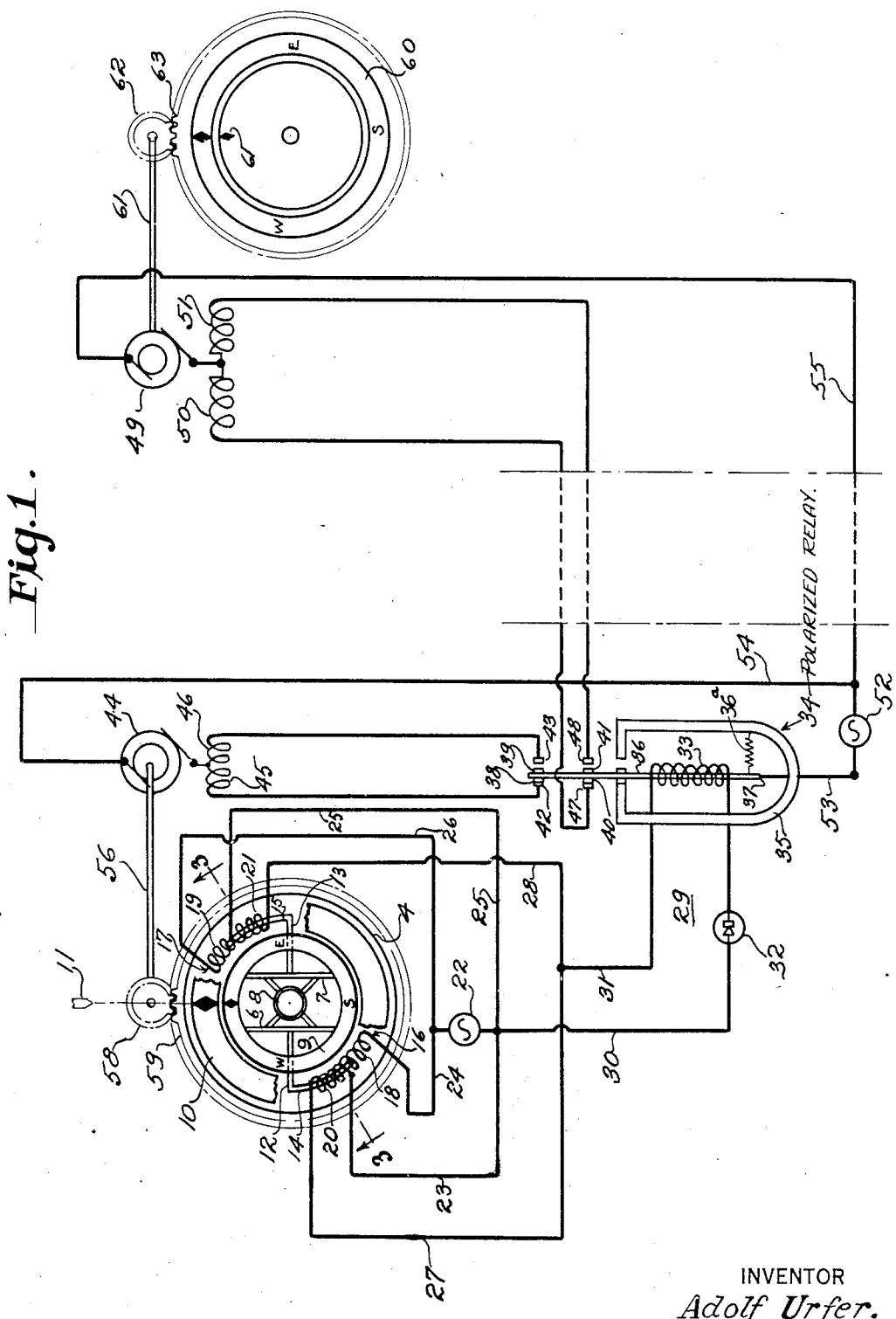

In the form shown in Fig. 1, 4 indicates a compass bowl of some suitable insulating material, such as glass or hard rubber, which may be filled with a liquid 5, such as Varnolene, kerosene, or other suitable liquid, preferably one having high insulating properties. Pivotally mounted in said bowl and centrally located therein are magnetic needles 6 and 7 held firmly together by means of a central bracket 8, which also serves as a pivoting means for the needles. A compass card 9 is mounted on the compass needles in any suitable manner to indicate relative displacements between the needles and the compass bowl with reference to another compass card 10 which is carried by the bowl. Both of said cards cooperate with a fixed lubber's mark 11 which indicates the ship's head to indicate the compass direction of the ship or other mobile object on which the bowl is mounted. Carried by the needles 6 and 7 and attached at right angles thereto are a pair of members 12 and 13, preferably of soft iron or other suitable magnetic material, having depending arcuate portions 14 and 15 which are adapted for relative movement with respect to the bowl 4. The depending portions 14 and 15 are adapted to pass into coils 16 and 17, each of which may be in the form of an auto-transformer comprising primaries 18 and 19 and secondaries 20 and 21, respectively. Said coils 16 and 17 may be mounted in any convenient manner on bowl 4 and so positioned that when the bowl is moved to the right in accordance with movement of the mobile object to which the bowl is attached, the soft iron depending portions or cores 14 and 15 will enter the coils 16 and 17, and when the bowl is moved to the left said cores will withdraw from the coils, thereby changing the coupling between the primaries and secondaries of the transformers. The liquid 5 is preferably of such viscosity as to secure the desired damping of the oscillations of the magnetic needles and of such a chemical nature as to render it a non-conductor of electricity, whereby deterioration of the needles by chemical action due to their direct contact with the liquid is eliminated.

Means are now provided including an indicator or repeater card remote from the compass bowl 4 and various other instrumentalities in combination with the coils 16 and 17 whereby relative angular movement between the mobile object and the compass needles, caused by a deviation of the mobile object from a predetermined path or course, is translated into a corresponding angular movement of the indicator, said latter movement being produced by a variation of the coupling of two pairs of electrical circuits which include primaries 18 and 19 and the secondaries 20 and 21, respectively. To this end primaries 18 and 19 are placed in shunt relation with a source of alternating current 22 which may be a generator, an oscillator, or any other suitable source of fluctuating current, by means of the leads 23 and 24 and leads 25 and 26. Secondaries 20 and 21 are directly coupled to primaries 18 and 19, respectively, and are also placed in shunt relation by means of leads 27 and 28 and leads 23 and 25. Current from the source 22 induced by the primaries 18 and 19 into secondaries 20 and 21 is passed to a circuit 29 by means of leads 30 and 31, said circuit including a rectifier 32 of any suitable type and a coil 33 of a polarized relay 34. The relay 34 comprises a polarizing magnet 35, which may be an electro-magnet or a permanent magnet of the horseshoe type, and an armature 36 of conducting material pivoted at 37 and provided with two pairs of contacts 38 and 39 and 40 and 41, respectively. Contacts 38 and 39 are adapted to cooperate with a pair of fixed contacts 42 and 43 to close the circuit of a reversible motor 44 through its split-field windings 45 and 46 to cause the motor to rotate in one direction or another, depending upon whether contacts 38 and 42 or 39 and 43 are closed.

Contacts 40 and 41 are adapted to cooperate with another pair of fixed contacts 47 and 48 to close the circuit of another reversible motor 49 through its split-field windings 50 and 51 to cause said motor to rotate in one direction or another, depending upon whether contacts 40 and 47 or contacts 41 and 48 are closed. Motors 44 and 49 are adapted to be energized from a suitable source of current 52 through leads 53 and 54 and leads 53 and 55, respectively. Motor 44 is arranged to rotate compass bowl 4 by means of a shaft 56 and suitable gearing 58 and 59 operatively connected to the shaft and bowl, respectively, while motor 49 is arranged to simultaneously rotate a repeater compass card 60 by means of a shaft 61 and suitable gearing 62 and 63 operatively connected to said shaft and compass card, respectively. Repeater card 60 is arranged to indicate relative displacements between the needles 6 and 7 and compass card 10 with reference to a fixed lubber's mark 61.

The current from source 22 is set to such a value that when the bowl is in a neutral position, as indicated, the induced currents in secondaries 20 and 21 when combined in circuit 29 will be of just the required value to maintain armature 36 of relay 34 in a balanced or neutral position against the pull of a spring 36a to keep the movable and fixed contacts open. The normal pull of spring 36a is counterbalanced by the normal, on-course, excitation of winding 33, to hold the armature 36 of the relay in neutral (center) position, unless the mobile object moves off course to the right or left. The rectifier 32 is essential to the circuit 29 in order to provide direct current through the coil 33 so that a magnetic field is produced which will, under conditions set forth above, balance the field of the polarizing magnet 35.

It will thus be seen that when the bowl 4 is in the position indicated in Fig. 1, the current flowing in secondaries 20 and 21 is such that a magnetic field is produced in coil 33 which is equal to the field of the polarizing magnet 35 and, therefore, the armature 36 remains in the neutral position, thereby producing no effect on motors 44 and 49 and indicating that the mobile object is on the desired course. However, as the mobile object on which the mechanism is mounted veers to the right of said desired course, bowl 4 will move therewith to the right and cause the coils 16 and 17 to telescope the soft iron portions 14 and 15, thereby increasing the coupling between the primaries and secondaries of said coils. The increased coupling produces a greater current flow through the secondaries and hence through the relay coil 33 which causes the armature 36 to move to the left. Said latter movement of the armature causes contacts 38 and 42 to close the circuit of motor 44 through field winding 45 and contacts 40 and 47 to close the circuit of motor 49 through field winding 50. The motor 44 then functions to return the bowl 4 to its normal or neutral position by rotating it to the left and causing coils 16 and 17 to move away from the core portions 14 and 15, thereby returning the armature 36 to open-circuit position. Simultaneously motor 49 functions to rotate repeater card 60 to the left to produce an indication thereon with reference to the stationary lubber's mark 61, corresponding to the angular displacement between compass card 9 carried by the needles 6 and 7 and compass card 10 carried by the bowl. When the mobile object veers to the left, coils 16 and 17 recede further from the portions 14 and 15, thereby decreasing the coupling between the primaries and secondaries of said coils and causing a smaller current flow through relay coil 33, which produces a weaker magnetic field than the field of the polarizing magnet 35, thus actuating armature 36 to the right. The movement of the armature 36 to the right then closes contacts 39 and 43 to energize the follow-up motor 44 through field winding 46 and contacts 41 and 48 to energize the circuit of motor 49 through the field 51. Consequently, the motors are rotated in the reverse direction to rotate bowl 4 back to its neutral position and repeater compass card 60 to the right, respectively.

Figure 2:
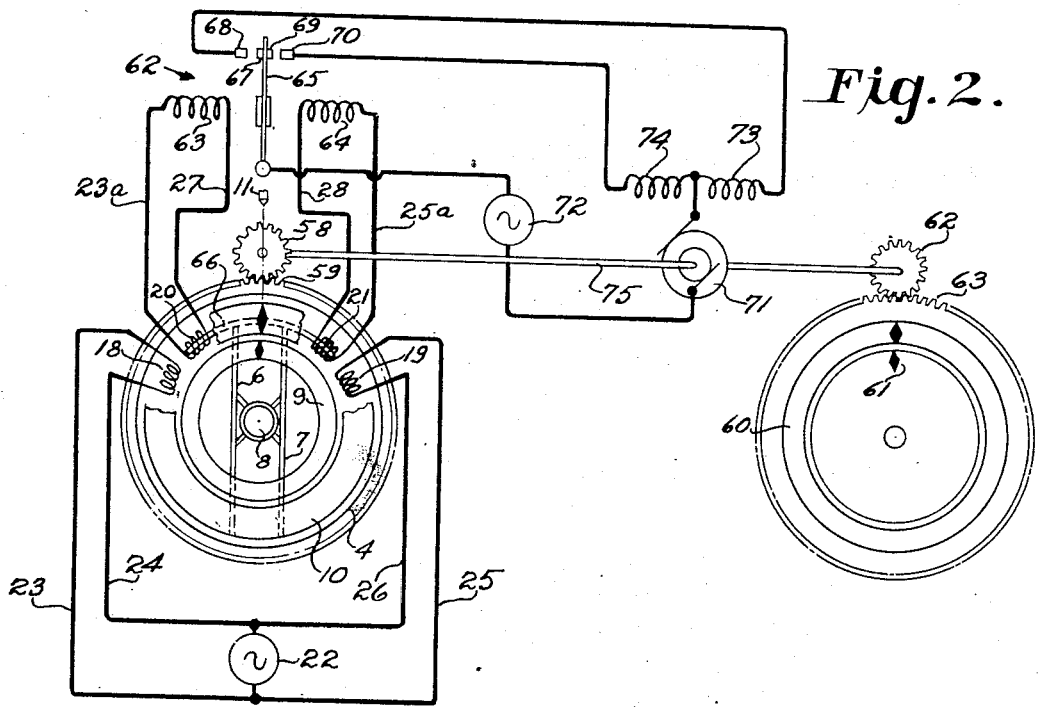
Fig. 2 is a similar diagram of another embodiment.

In Fig. 2 is shown another embodiment of the invention, in which the primary coils 18 and 19 are inductively coupled to the secondaries 20 and 21 instead of being directly coupled in the form of an auto-transformer as in Fig. 1, and in which the polarized relay 34 is replaced by a differential relay 62 provided with coils 63 and 64 to actuate an armature 65. The members 12 and 13 of Fig. 1 are replaced by an arcuate cylindrical core 66, also preferably of soft iron, attached to the ends of the needles 6 and 7. The opposite ends of said core 66 are adapted to pass into coils 18 and 20 and coils 19 and 21, which are mounted on bowl 4, as before, and so positioned that when the bowl moves to the right in accordance with the movement of the mobile object to which the bowl is attached, the iron core will enter the coils 18 and 20, and when the bowl is moved to the left, the core will enter the coils 19 and 21, thereby increasing the coupling between one pair of coils while simultaneously decreasing the coupling between the other pair of coils. For example, when the bowl moves to the right the coupling between coils 18 and 20 is increased and the coupling between coils 19 and 21 is decreased, thereby causing more current to flow through coil 63 and less current to flow through relay coil 64. The magnetic field of coil 63 is then greater than that of coil 64 and armature 65 is actuated to close contacts 67 and 68, and when the bowl moves to the left, more current flows through coil 64 than coil 63, producing a resultant field which actuates the armature 65 to the right to close contacts 69 and 70. The closing of contacts 67 and 68 causes the energization of motor 71 from a suitable source 72 through the motor winding 73 to cause the rotation of said motor in one direction while the closing of contacts 69 and 70 causes the energization of said motor through winding 74 to cause rotation of said motor in the opposite direction, as in the modification shown in Fig. 1. Motor 71 is adapted to simultaneously rotate compass bowl 4 and the compass card 60 through a shaft 75 and the respective gearing of the bowl and the card. The fundamental operation of the embodiment shown in Fig. 2 is similar to that of Fig. 1, that is, relative angular displacement between compass card 9 carried by the needles 6 and 7 and compass card 10 carried by the bowl 4 produces corresponding angular displacement between repeater card 60 and lubber's mark 61. The bowl 4 is also simultaneously returned to its normal position.

Figure 3:
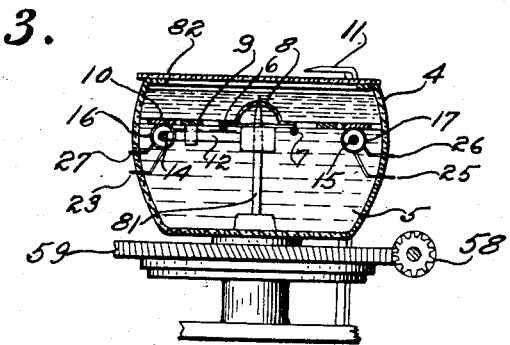
Fig. 3 is a vertical section taken through the controlling device on line 3—3 of Fig. 1.

In Fig. 3, bowl 4 is shown in vertical section taken on line 3—3 of Fig. 1 to show a support 81 which carries the compass needles 6 and 7 and compass card 9 by means of the bracket 8. The bowl is provided with a cover 82 of some suitable transparent material, such as glass, in order that the compass cards may be viewed therethrough.

Thus novel means is provided in combination with a magnetic compass, which accurately and effectively repeats relative angular movements between a mobile object and the directional element of the compass carried by said object, thereby enabling the pilot or navigator of the object, which may be a ship or aircraft, to quickly perceive, at a point or points which may, if desired, be located at a distance from the compass whether he is on or off his course, and to pilot the craft accordingly. The device is quite simple and easily constructed, thereby reducing the cost of manufacture, and is rugged enough to withstand hard use under the trying conditions generally encountered in aerial navigation without sacrificing or decreasing the efficiency of the device.

The magnetic compass may be mounted in any convenient location on a ship or aircraft, while the indicator or repeater which is operated thereby may be conveniently mounted on the instrument panel in the cockpit of an aircraft, for example, or on the bridge of a vessel, etc.

It will also be seen from the foregoing description that novel means are provided for repeating relative angular movements between a mobile object and a directional element carried by said object whereby the use of direct current is rendered unnecessary and whereby movable contacts or electrodes are eliminated.

It is obvious that a course-setting mechanism may be employed with the compass, whereby the compass bowl may be rotated to indicate a predetermined course or path which the mobile object is to follow and to utilize the repeating indicator to show when said object is on or off said predetermined path or course.

Other changes and modifications of the structures shown, and rearrangement of parts, will now be apparent to those skilled in the art and may be made without departing from the scope of the invention. Reference will therefore be had to the appended claims for a definition of the limits of said invention.

What is claimed is:

1. In combination, a compass having a bowl, a pivoted magnetic needle assembly in said bowl, an electro-magnetic arrangement including two similar pairs of primary and secondary coils symmetrically arranged with respect to the needle assembly, and a magnetic member carried by the latter and arranged to move in coupling relation to the pairs of coils and so related to both pairs that said member moves through the secondary into the primary coil of each pair to increase the coupling.

2. In combination, a compass having a bowl, a pivoted magnetic needle assembly in said bowl, an electro-magnetic arrangement including two similar pairs of primary and secondary coils symmetrically arranged with respect to the needle assembly, and a magnetic member carried by the latter and arranged to move in coupling relation to the pairs of coils and so related to both pairs that said member moves through one coil and into the other coil of each pair to increase the coupling.

3. In combination, a compass having a bowl, a pivoted magnetic needle assembly in said bowl, an electro-magnetic arrangement including two similar pairs of primary and secondary coils symmetrically arranged with respect to the needle assembly, and a magnetic member carried by the latter and arranged to move in coupling relation to the pairs of coils and so related to both pairs that said member moves through the secondary into the primary coil of each pair to increase the coupling, a source of alternating current in circuit with the primary coils, conductors connecting the secondary coils in parallel, a polarized relay including a winding and an armature having a contact movable between two stationary contacts and biased to normally lie in neutral position therebetween, a rectifier, and conductors connecting the parallel-connected secondaries in series with the relay winding and the rectifier.

4. In combination, a compass having a bowl, a pivoted magnetic needle assembly in said bowl, an electro-magnetic arrangement including two similar pairs of primary and secondary coils symmetrically arranged with respect to the needle assembly, and a magnetic member carried by the latter and arranged to move in coupling relation to the pairs of coils and so related to both pairs that said member moves through one coil and into the other coil of each pair to increase the coupling, a source of alternating current in circuit with the primary coils, conductors connecting the secondary coils in parallel, a polarized relay including a winding and an armature having a contact movable between two stationary contacts and biased to normally lie in neutral position therebetween, a rectifier, and conductors connecting the parallel-connected secondaries in series with the relay winding and the rectifier.

5. In combination, a compass having a bowl, a pivoted magnetic needle assembly in said bowl, an electro-magnetic arrangement including two similar pairs of primary and secondary coils symmetrically arranged with respect to the needle assembly, and a magnetic member carried by the latter and arranged to move in coupling relation to the pairs of coils and so related to both pairs that said member moves through one coil and into the other coil of each pair to increase the coupling, a source of alternating current in circuit with the primary coils, a double-acting relay having an armature disposed between a pair of windings one of which is connected to one secondary coil and the other of which is connected to the other secondary coil, and a contact carried by said armature and movable to engage one or the other of a pair of stationary contacts disposed one on each side of said movable contact.

ADOLF URFER.